US009747662B2

(12) United States Patent
Becker et al.

(10) Patent No.: US 9,747,662 B2
(45) Date of Patent: *Aug. 29, 2017

(54) COLLECTING AND VIEWING THREE-DIMENSIONAL SCANNER DATA IN A FLEXIBLE VIDEO FORMAT

(71) Applicant: FARO Technologies, Inc., Lake Mary, FL (US)

(72) Inventors: Reinhard Becker, Ludwigsburg (DE); Martin Ossig, Tamm (DE)

(73) Assignee: FARO TECHNOLOGIES, INC., Lake Mary, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/434,220

(22) Filed: Feb. 16, 2017

(65) Prior Publication Data

US 2017/0161867 A1    Jun. 8, 2017

Related U.S. Application Data

(63) Continuation of application No. 14/493,426, filed on Sep. 23, 2014.

(30) Foreign Application Priority Data

Sep. 24, 2013    (DE) .......................... 10 2013 110 580

(51) Int. Cl.
*G06T 3/00* (2006.01)
*H04N 5/232* (2006.01)
(Continued)

(52) U.S. Cl.
CPC .............. *G06T 3/0087* (2013.01); *G01S 7/51* (2013.01); *G01S 17/89* (2013.01); *G06T 7/38* (2017.01); *G06T 7/521* (2017.01); *H04N 5/147* (2013.01); *H04N 5/23238* (2013.01); *G06T 2207/10021* (2013.01)

(58) Field of Classification Search
CPC ... G06T 3/0087; H04N 5/147; H04N 5/23238
See application file for complete search history.

(56) References Cited

U.S. PATENT DOCUMENTS

| 6,369,812 B1 | 4/2002 | Iyriboz et al. |
| 2006/0114251 A1 | 6/2006 | Miller |

(Continued)

FOREIGN PATENT DOCUMENTS

| DE | 102014116904 A1 | 5/2016 |
| WO | 2012037157 A2 | 3/2012 |
| WO | 2012059626 A1 | 5/2012 |

OTHER PUBLICATIONS

German Office Action for Appln No. 102013110580.7 dated May 26, 2014; 2 pgs.

(Continued)

*Primary Examiner* — Nam Pham
(74) *Attorney, Agent, or Firm* — Cantor Colburn LLP

(57) ABSTRACT

A method interactively displays panoramic images of a scene. The method includes measuring 3D coordinates of the scene with a 3D measuring instrument at a first position and a second position. The 3D coordinates are registering into a common frame of reference. Within the scene, a trajectory includes a plurality of trajectory points. Along the trajectory, 2D images are generated from the commonly registered 3D coordinates. A trajectory display mode sequentially displays a collection of 2D images at the trajectory points. A rotational display mode allows a user to select a desired view direction at a given trajectory point. The user selects the trajectory display mode or the rotational display mode and sees the result shown on the display device.

20 Claims, 7 Drawing Sheets

(51) Int. Cl.
*G06T 7/38* (2017.01)
*H04N 5/14* (2006.01)
*G06T 7/521* (2017.01)
*G01S 17/89* (2006.01)
*G01S 7/51* (2006.01)

(56) References Cited

U.S. PATENT DOCUMENTS

| | | |
|---|---|---|
| 2009/0185741 A1 | 7/2009 | Nahari et al. |
| 2012/0033069 A1 | 2/2012 | Becker et al. |
| 2012/0155744 A1 | 6/2012 | Kennedy et al. |
| 2012/0229870 A1* | 9/2012 | Inoue ............ G01S 17/89 358/448 |
| 2013/0083055 A1 | 4/2013 | Piemonte et al. |
| 2015/0085068 A1 | 3/2015 | Becker et al. |

OTHER PUBLICATIONS

PCT International Search Report and Written Opinon of the International Searching Authority for International Application No. PCT/US2014/057086 dated Jan. 12, 2015; 13 pages.

Ho, Nghia et al., "Large Scale 3D Environmental Modelling for Stereoscopic Walk-Through Visualisation", 3DTV Conference, 2007, IEEE, PI, May 1, 2007 (May 1, 2007), pp. 1-4, XP031158159; 4 pgs.

International Search Report and Written Opinion for International Application No. PCT/US2016/060889 dated Mar. 10, 2017; 13 pages.

* cited by examiner

COLLECTING AND VIEWING THREE-DIMENSIONAL SCANNER DATA IN A FLEXIBLE VIDEO FORMAT

CROSS-REFERENCE TO RELATED APPLICATIONS

The present application is a continuation application of U.S. patent application Ser. No. 14/493,426 filed on Sep. 23, 2014, which claims the benefit of German Patent Application No. DE102013110580.7, filed Sep. 24, 2013, the contents of both of which are hereby incorporated by reference in its entirety.

BACKGROUND

The subject matter disclosed herein relates to use of a three-dimensional (3D) laser scanner time-of-flight (TOF) coordinate measurement device. A 3D laser scanner of this type steers a beam of light to a non-cooperative target such as a diffusely scattering surface of an object. A distance meter in the device measures a distance to the object, and angular encoders measure the angles of rotation of two axles in the device. The measured distance and two angles enable a processor in the device to determine the 3D coordinates of the target.

Discussed herein is a TOF laser scanner which is any type of scanner where the distance to a target point is based on the speed of light in air between the scanner and the target point. Laser scanners are typically used for scanning closed or open spaces such as interior areas of buildings, industrial installations and tunnels. They are used for many purposes, including industrial applications and accident reconstruction applications. A laser scanner can be used to optically scan and measure objects in a volume around the scanner through the acquisition of data points representing objects within the volume. Such data points are obtained by transmitting a beam of light onto the objects and collecting the reflected or scattered light to determine the distance, two-angles (i.e., an azimuth and a zenith angle), and optionally a gray-scale value. This raw scan data is collected, stored and sent to a processor or processors to generate a 3D image representing the scanned area or object. To generate the image, at least three values are collected for each data point. These three values may include the distance and two angles, or may be transformed values, such as the x, y, z coordinates. In an embodiment, a fourth value collected by the 3D laser scanner is a gray-scale value for each point measured. Such a gray-scale value is related to the irradiance of scattered light returning to the scanner.

Angular encoders are used to measure the two angles of rotation about the two axes of rotation. One type of angular encoder includes a disk and one or more read heads. In an embodiment, the disk is affixed to a rotating shaft, and the one or more read heads are affixed to a portion that is stationary with respect to the rotating shaft.

Many contemporary laser scanners also include a camera mounted on the laser scanner for gathering camera digital images of the environment and for presenting the camera digital images to an operator of the laser scanner. By viewing the camera images, the operator of the scanner can determine the field of view of the measured volume and adjust settings on the laser scanner to measure over a larger or smaller region of space if the field of view needs adjusting. In addition, the camera digital images may be transmitted to a processor to add color to the scanner image. In order to generate a color scanner image, at least six values (three positional coordinates such as x, y, z; and red value, green value, blue value or "RGB") are collected for each data point.

The data collected by a laser scanner is often referred to as point cloud data because the data, which is typically relatively dense, may resemble a cloud. The term point cloud is taken herein to mean a collection of 3D values associated with scanned objects. The elements of the point cloud may also include additional attributes such as gray scale and color. The point cloud data may be used to produce 3D representations of the scene being scanned. Such representations may be viewed in a variety of ways, as discussed further hereinbelow. One way to represent point cloud data is to show it as a video such as a "fly-through" video in which an observer is shown a changing a two-dimensional (2D) display that produces the impression of the observer moving through space in three dimensions. Up until now such videos have been outside the control of the operator or separated from a preferred path.

Accordingly, while existing 3D scanners are suitable for their intended purposes, what is needed is a 3D scanner having certain features of embodiments of the present invention.

BRIEF DESCRIPTION

According to one aspect of the invention, a method of interactively displaying panoramic images of a scene is provided that includes providing a display device; measuring a first plurality of 3D coordinates of the scene with a 3D measuring instrument placed in a first frame of reference, the 3D instrument being placed in a first position; measuring a second plurality of 3D coordinates of the scene with the 3D measuring instrument placed in a second frame of reference, the 3D instrument being placed in a second position different than the first position; registering the first plurality of 3D coordinates and the second plurality of 3D coordinates together in a common plurality of 3D coordinates, the common plurality of 3D coordinates being in a common frame of reference; providing a trajectory within the scene, the trajectory including a collection of trajectory points; generating along the trajectory a plurality of 2D images at each trajectory point, the 2D images based at least in part on the common plurality of 3D coordinates, the 2D images constructed to represent panoramic views at the trajectory points, each of the panoramic views having an observer field of view (FOV), each of the panoramic views being viewable from any of a plurality of observer view directions; providing a trajectory display mode, the trajectory display mode configured to display a collection of the 2D images sequentially along the collection of trajectory points; providing a rotational display mode, the rotational display mode configured to display the 2D images at a single trajectory point and from a selected view direction, the selected view direction being selected from among the plurality of observer view directions; providing a user interface that includes the trajectory display mode and the rotational display mode; choosing by the user a selected display mode from among display modes, the display modes including at least the trajectory display mode and the rotational display mode; and displaying in the selected display mode on the display device These and other advantages and features will become more apparent from the following description taken in conjunction with the drawings.

BRIEF DESCRIPTION OF THE DRAWING

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION

The present invention relates to a 3D coordinate measurement device that sends a beam of light to an object in a direction determined by two or more angular encoders within the device. Embodiments of the present invention provide a method for obtaining a video display along a trajectory that provides a 3D representation in a panoramic view, with provision made for a user to rotate the view along selected axes. An aspect of the 3D video described herein is that the video may be stopped, slowed, or reversed as desired by the user. Furthermore, the user is permitted to view in detail selected objects within the scene.

Figure 1:
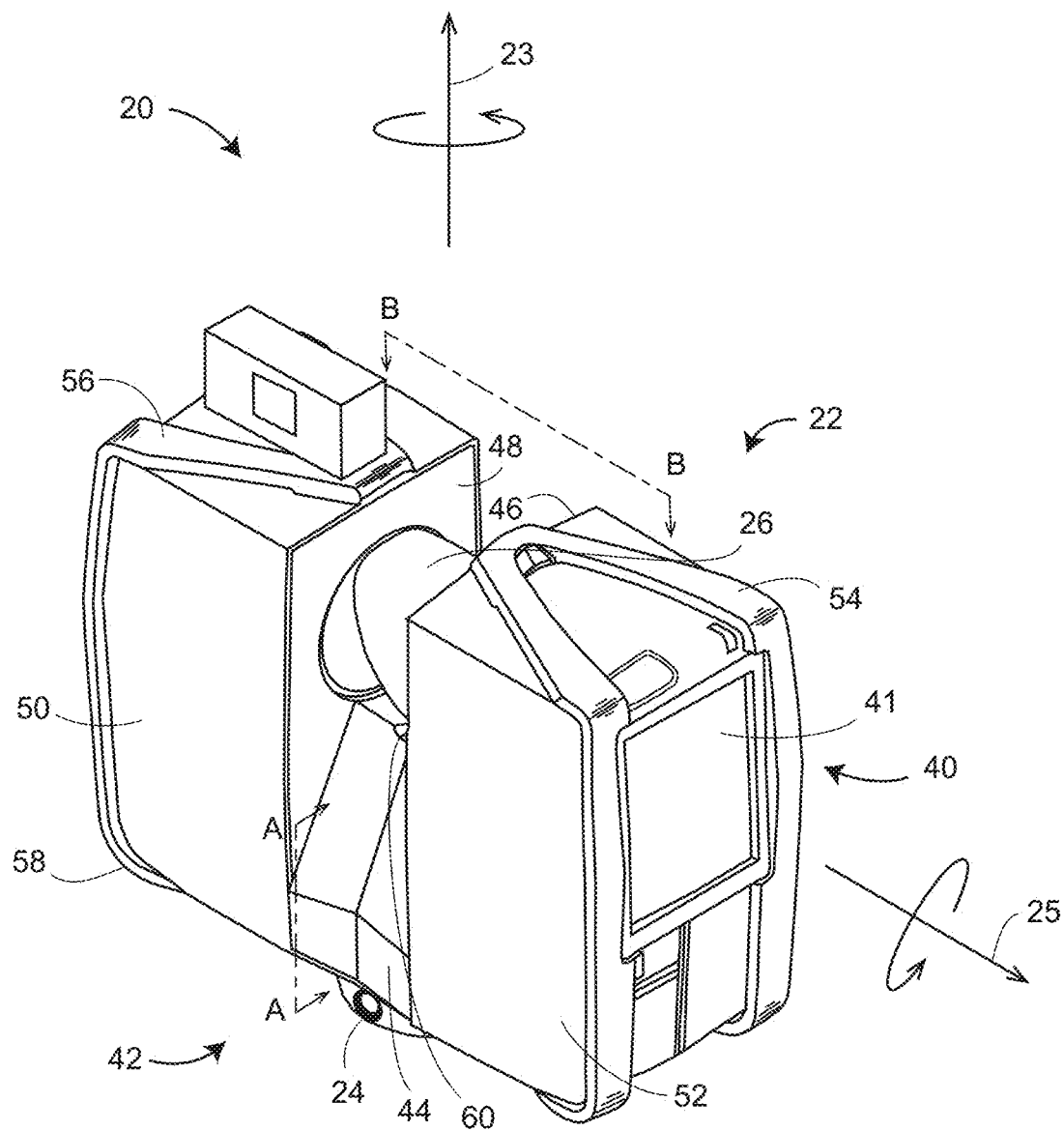
FIG. 1 is a perspective view of a laser scanner in accordance with an embodiment of the invention.
Figure 2:
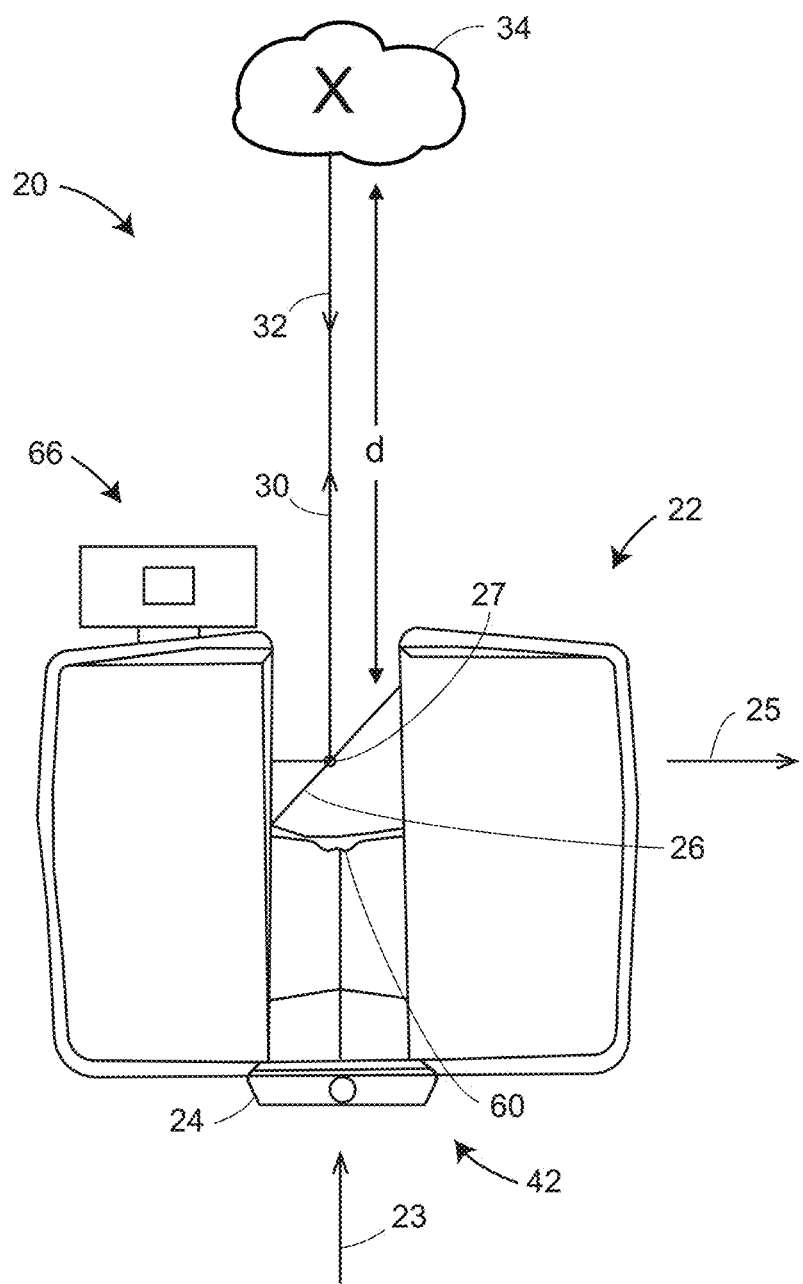
FIG. 2 is a side view of the laser scanner illustrating the method of measurement.
Figure 3:
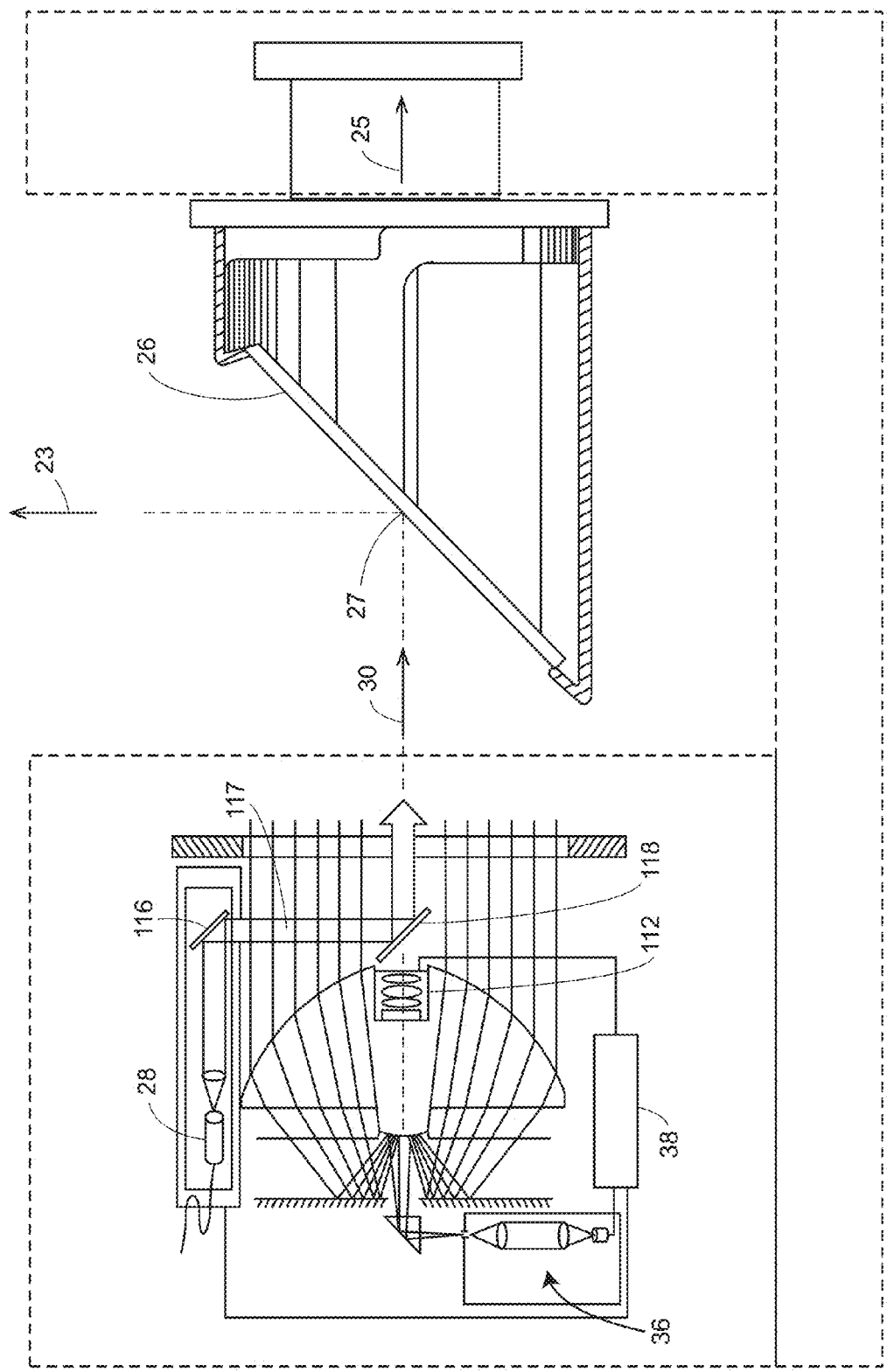
FIG. 3 is a schematic illustration of the optical, mechanical, and electrical components of the laser scanner.

Referring now to FIGS. 1-3, a laser scanner 20 is shown for optically scanning and measuring the environment surrounding the laser scanner 20. The laser scanner 20 has a measuring head 22 and a base 24. The measuring head 22 is mounted on the base 24 such that the laser scanner 20 may be rotated about a vertical axis 23. In one embodiment, the measuring head 22 includes a gimbal point 27 that is a center of rotation about the vertical axis 23 and a horizontal axis 25. The measuring head 22 has a rotary mirror 26, which may be rotated about the horizontal axis 25. The rotation about the vertical axis may be about the center of the base 24. The terms vertical axis and horizontal axis refer to the scanner in its normal upright position. It is possible to operate a 3D coordinate measurement device on its side or upside down, and so to avoid confusion, the terms azimuth axis and zenith axis may be substituted for the terms vertical axis and horizontal axis, respectively. The term pan axis may also be used as an alternative to vertical axis.

The measuring head 22 is further provided with an electromagnetic radiation emitter, such as light emitter 28, for example, that emits an emitted light beam 30. In one embodiment, the emitted light beam 30 is a coherent light such as a laser beam. The laser beam may have a wavelength range of approximately 300 to 1600 nanometers, for example 790 nanometers, 905 nanometers, 1550 nm, or less than 400 nanometers. It should be appreciated that other electromagnetic radiation beams having greater or smaller wavelengths may also be used. The emitted light beam 30 is amplitude or intensity modulated, for example, with a sinusoidal waveform or with a rectangular waveform. The emitted light beam 30 is emitted by the light emitter 28 onto the rotary mirror 26, where it is deflected to the environment. A reflected light beam 32 is reflected from the environment by an object 34. The reflected or scattered light is intercepted by the rotary mirror 26 and directed into a light receiver 36. The directions of the emitted light beam 30 and the reflected light beam 32 result from the angular positions of the rotary mirror 26 and the measuring head 22 about the axes 25 and 23, respectively. These angular positions in turn depend on the corresponding rotary drives or motors.

Coupled to the light emitter 28 and the light receiver 36 is a controller 38. The controller 38 determines, for a multitude of measuring points X, a corresponding number of distances d between the laser scanner 20 and the points X on object 34. The distance to a particular point X is determined based at least in part on the speed of light in air through which electromagnetic radiation propagates from the device to the object point X. In one embodiment the phase shift of modulation in light emitted by the laser scanner 20 and the point X is determined and evaluated to obtain a measured distance d.

The speed of light in air depends on the properties of the air such as the air temperature, barometric pressure, relative humidity, and concentration of carbon dioxide. Such air properties influence the index of refraction n of the air. The speed of light in air is equal to the speed of light in vacuum c divided by the index of refraction. In other words, $c_{air}=c/n$. A laser scanner of the type discussed herein is based on the time-of-flight of the light in the air (the round-trip time for the light to travel from the device to the object and back to the device). A method of measuring distance based on the time-of-flight of light (or any type of electromagnetic radiation) depends on the speed of light in air and is therefore easily distinguished from methods of measuring distance based on triangulation. Triangulation-based methods involve projecting light from a light source along a particular direction and then intercepting the light on a camera pixel along a particular direction. By knowing the distance between the camera and the projector and by matching a projected angle with a received angle, the method of triangulation enables the distance to the object to be determined based one known length and two known angles of a triangle. The method of triangulation, therefore, does not directly depend on the speed of light in air.

The scanning of the volume about the laser scanner 20 takes place by quickly rotating the rotary mirror 26 about axis 25 while slowly rotating the measuring head 22 about axis 23, thereby moving the assembly in a spiral pattern. In an exemplary embodiment, the rotary mirror rotates at a maximum speed of 5820 revolutions per minute. For such a scan, the gimbal point 27 defines the origin of the local stationary reference system. The base 24 rests in this local stationary reference system.

In addition to measuring a distance d from the gimbal point 27 to an object point X, the scanner 20 may also collect gray-scale information related to the received optical power. The gray-scale value may be determined, for example, by integration of the bandpass-filtered and amplified signal in the light receiver 36 over a measuring period attributed to the object point X.

The measuring head 22 may include a display device 40 integrated into the laser scanner 20. The display device 40 may include a graphical touch screen 41, as shown in FIG. 1, which allows the operator to set the parameters or initiate the operation of the laser scanner 20. For example, the screen 41 may have a user interface that allows the operator to provide measurement instructions to the device, and the screen may also display measurement results.

The laser scanner 20 includes a carrying structure 42 that provides a frame for the measuring head 22 and a platform for attaching the components of the laser scanner 20. In one embodiment, the carrying structure 42 is made from a metal such as aluminum. The carrying structure 42 includes a traverse member 44 having a pair of walls 46, 48 on opposing ends. The walls 46, 48 are parallel to each other and extend in a direction opposite the base 24. Shells 50, 52 are coupled to the walls 46, 48 and cover the components of the laser scanner 20. In the exemplary embodiment, the shells 50, 52 are made from a plastic material, such as polycarbonate or polyethylene for example. The shells 50, 52 cooperate with the walls 46, 48 to form a housing for the laser scanner 20.

On an end of the shells 50, 52 opposite the walls 46, 48 a pair of yokes 54, 56 are arranged to partially cover the respective shells 50, 52. In the exemplary embodiment, the yokes 54, 56 are made from a suitably durable material, such as aluminum for example, that assists in protecting the shells 50, 52 during transport and operation. The yokes 54, 56 each includes a first arm portion 58 that is coupled, such as with a fastener for example, to the traverse 44 adjacent the base 24. The arm portion for each yoke 54, 56 extends from the traverse 44 obliquely to an outer corner of the respective shell 50, 54. From the outer corner of the shell, the yokes 54, 56 extend along the side edge of the shell to an opposite outer corner of the shell. Each yoke 54, 56 further includes a second arm portion that extends obliquely to the walls 46, 48. It should be appreciated that the yokes 54, 56 may be coupled to the traverse 42, the walls 46, 48 and the shells 50, 54 at multiple locations.

The pair of yokes 54, 56 cooperate to circumscribe a convex space within which the two shells 50, 52 are arranged. In the exemplary embodiment, the yokes 54, 56 cooperate to cover all of the outer edges of the shells 50, 54, while the top and bottom arm portions project over at least a portion of the top and bottom edges of the shells 50, 52. This provides advantages in protecting the shells 50, 52 and the measuring head 22 from damage during transportation and operation. In other embodiments, the yokes 54, 56 may include additional features, such as handles to facilitate the carrying of the laser scanner 20 or attachment points for accessories for example.

On top of the traverse 44, a prism 60 is provided. The prism extends parallel to the walls 46, 48. In the exemplary embodiment, the prism 60 is integrally formed as part of the carrying structure 42. In other embodiments, the prism 60 is a separate component that is coupled to the traverse 44. When the mirror 26 rotates, during each rotation the mirror 26 directs the emitted light beam 30 onto the traverse 44 and the prism 60. Due to non-linearities in the electronic components, for example in the light receiver 36 for example, the measured distances d depend on signal intensity, such as brightness and temperature for example. In an embodiment, a distance correction is stored in the scanner as a function (possibly a nonlinear function) of distance to a measured point and brightness of light returned from the measured point. Since the prism 60 is at a known distance from the gimbal point 27, the measured brightness level of light reflected by the prism 60 may be used to correct distance measurements for other measured points, thereby allowing for compensation of environmental variables such as temperature. In the exemplary embodiment, the adjustment of the distance correction is performed by the controller 38. In other embodiments, described in more detail hereinbelow, the prism further provides a means of correcting for movement of the encoder index mark in relation to stationary portion of the device 20.

The base 24 is coupled to a swivel assembly (not shown) such as that described in commonly owned U.S. Pat. No. 8,705,012 ('012), which is incorporated by reference herein in its entirety. The swivel assembly is housed within the carrying structure 42 and includes a motor that is configured to rotate the measuring head 22 about the axis 23.

An auxiliary image acquisition device 66 may be a device that captures and measures a parameter associated with the scanned volume or the scanned object and provides a signal representing the measured quantities over an image acquisition area. The auxiliary image acquisition device 66 may be, but is not limited to, a pyrometer, a thermal imager, an ionizing radiation detector, or a millimeter-wave detector.

In an embodiment, a camera (first image acquisition device) 112 is located internally to the scanner and may have the same optical axis as the 3D scanner device. In this embodiment, the first image acquisition device 112 is integrated into the measuring head 22 and arranged to acquire images along the same optical pathway as emitted light beam 30 and reflected light beam 32. In this embodiment, the light emitter 28 is reflected off a fixed mirror 116, travels to dichroic beam-splitter 118 that reflects the light 117 from the light emitter 28 onto the rotary mirror 26. The dichroic beam-splitter 118 allows light to pass through at wavelengths different than the wavelength of light 117. For example, the light emitter 28 may be a near infrared laser light (for example, light at wavelengths of 780 nm or 1150 nm), with the dichroic beam-splitter 118 configured to reflect the infrared laser light while allowing visible light (e.g., wavelengths of 400 to 700 nm) to transmit through. In other embodiments, the determination of whether the light passes through the beam-splitter 118 or is reflected depends on the polarization of the light. The digital camera 112 takes 2D photographic images of the scanned area to capture color data to add to the scanned image. In the case of a built-in color camera having an optical axis coincident with that of the 3D scanning device, the direction of the camera view may be easily obtained by simply adjusting the steering mechanisms of the scanner—for example, by adjusting the azimuth angle about the axis 23 and by steering the mirror 26 about the axis 25.

Figure 4:
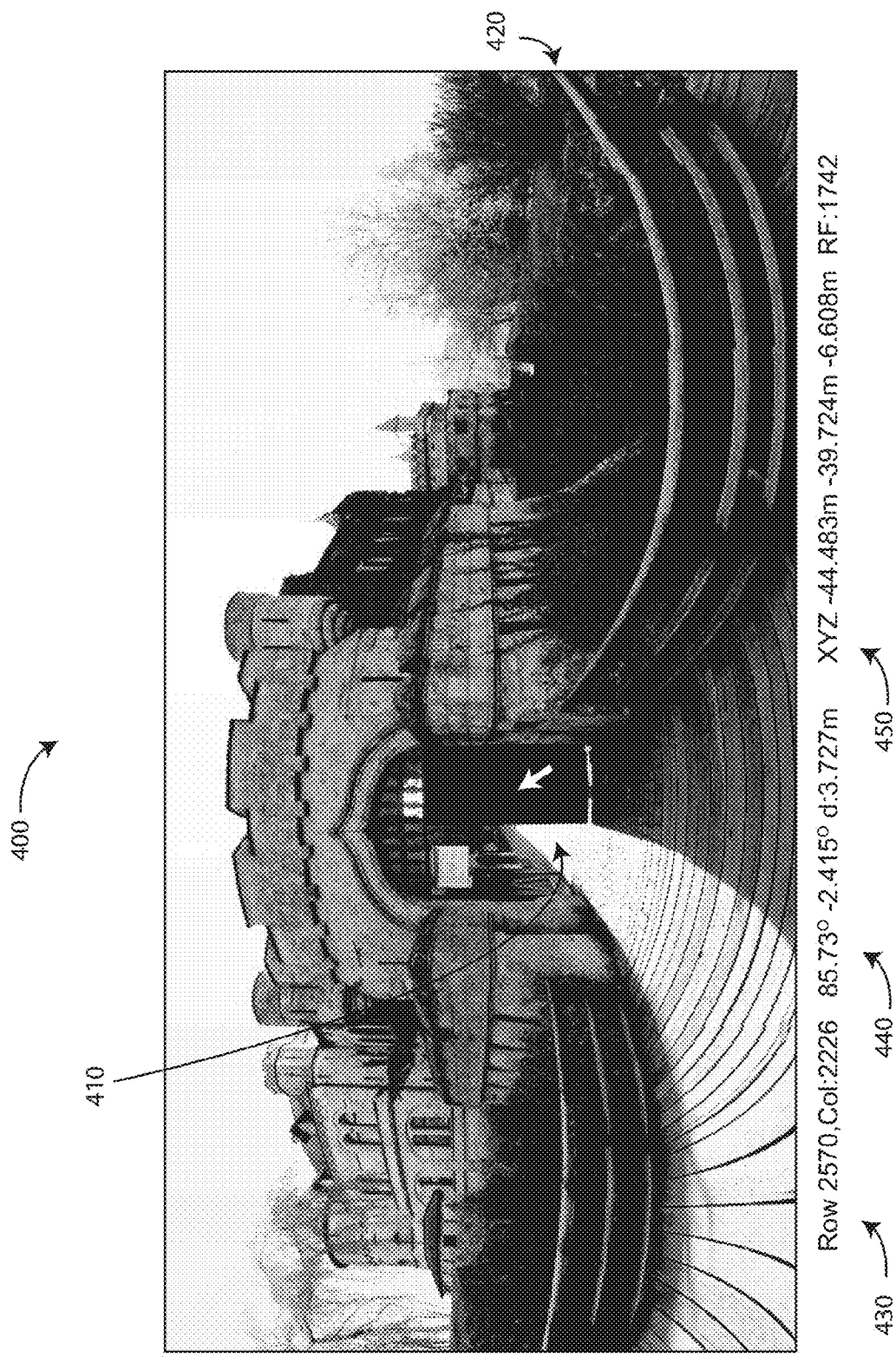
FIG. 4 depicts a planar view of a 3D scanned image.

FIG. 4 depicts an example of a planar view of a 3D scanned image 400. The planar view depicted in FIG. 4 maps an image obtained in the native coordinate system of the scanner (e.g., a spherical coordinate system) onto a plane (e.g., a planar view). With this type of mapping, straight lines appear to be curved, as for example the straight fence railings 420 that appear curved in the planar view of the 3D image. FIG. 4 displays complete scan of a laser scanner in one image without occultation. The planar view may be a 3D unprocessed scanned image displaying just the gray-scale values received from the distance sensor arranged in columns and rows as they were recorded. In addition, the 3D unprocessed scanned image of the planar view may be in full resolution or reduced resolution depending on system characteristics (e.g., display device, storage, processor). The planar view may be a 3D processed scanned image that depicts either gray-scale values (resulting from the light irradiance measured by the distance sensor for each pixel) or color values (resulting from camera images which have been mapped onto the scan). The user interface associated with the display unit, which may be integral to the laser scanner, may provide a point selection mechanism, which in FIG. 4 is the cursor 410. The point selection mechanism may be used to reveal dimensional information about the volume of space being measured by the laser scanner. In FIG. 4, the row and column at the location of the cursor are indicated on the display at 430. The two measured angles and one measured distance (the 3D coordinates in a spherical coordinate system) at the cursor location are indicated on the display at 440. Cartesian XYZ coordinate representations of the cursor location are indicated on the display at 450.

Figure 5:
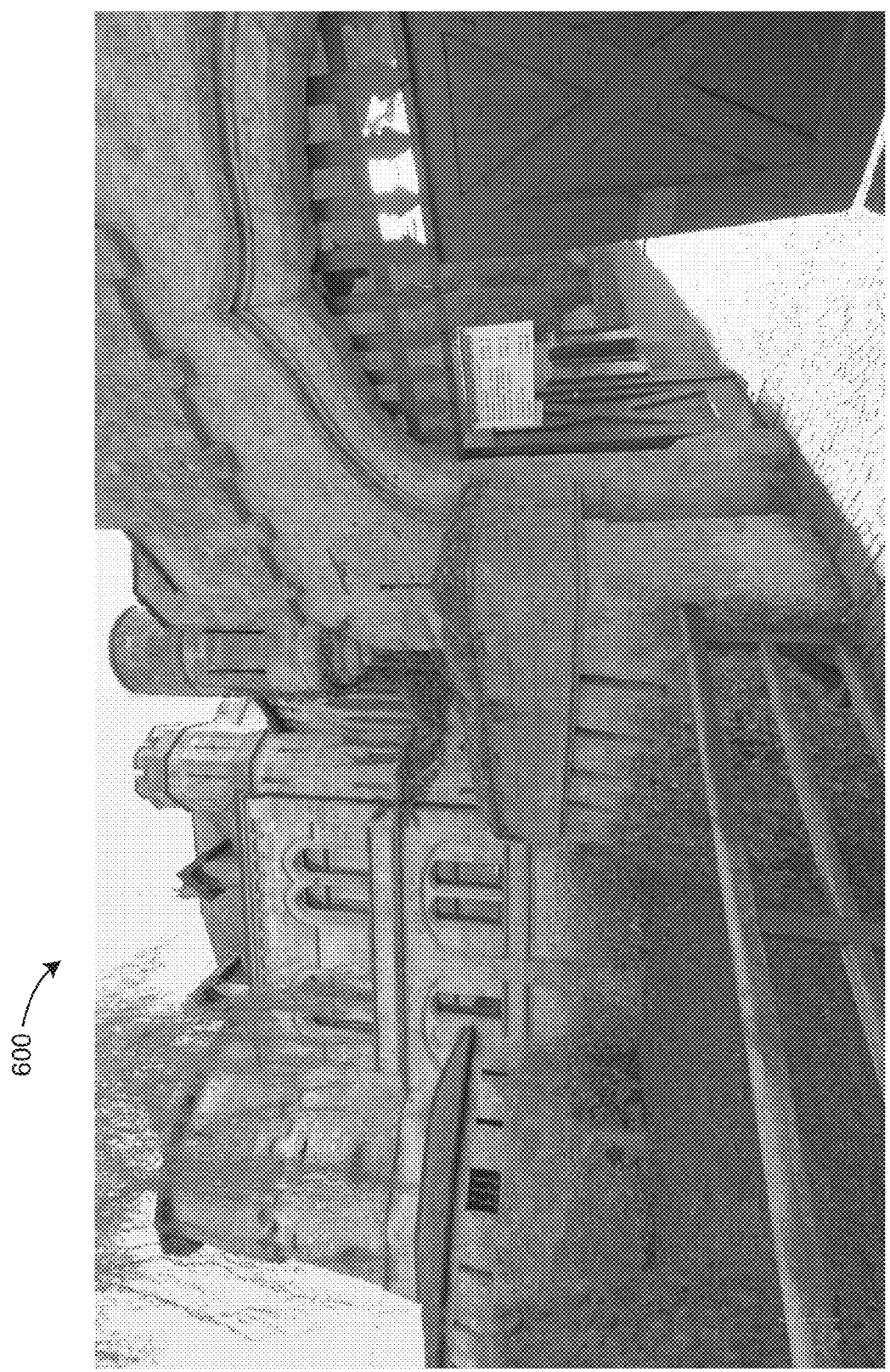
FIG. 5 depicts an embodiment of a panoramic view of a 3D scanned image generated by mapping a planar view onto a sphere.

FIG. 5 depicts an example of a panoramic view of a 3D scanned image 600 generated by mapping a planar view onto a sphere, or in some cases a cylinder. A panoramic view can be a 3D unprocessed scanned image in which no coordinate data is made available to the user, or it can be a 3D processed scanned image (such as that shown in FIG. 5) in which 3D information (e.g., 3D coordinates) is available. The panoramic view may be in full resolution or reduced resolution depending on system characteristics. It should be pointed out that an image such as FIG. 5 is a 2D image that represents a 3D scene when viewed from a particular perspective. In this sense, the image of FIG. 5 is much like an image that might be captured by a 2D camera or a human eye.

To scan a scene from different directions or to scan a large space, multiple scans are captured from different locations (corresponding to a number of different centers Ci) and then registered in a joint coordinate system xyz of the scene. The laser scanner 20 must change its location for this purpose, thus moving each time the center Ci of the laser scanner 20 within the joint coordinate system xyz to a new center Ci. To easily change the location, the laser scanner 20 may be mounted on a trolley, as described in U.S. Pat. No. 8,699,036 ('036), the contents of which are incorporated herein by reference, so that the laser scanner 20 can be moved from one location with a center Ci to another location with a new center Ci and the relative position of the each of the centers Ci registered together. Alternatively, the laser scanner 20 is mounted on a tripod. When all scans are registered in the joint coordinate system xyz of the scene, the entity of all measuring points X of all scans forms a three-dimensional point cloud 3DP.

Registration generally includes a first step of measuring a first plurality of 3D coordinates of a scene with the scanner in a first frame of reference, with the scanner at a first position. It further includes a second step of measuring a second plurality of 3D coordinates of the scene with the scanner in a second frame of reference and with the scanner at a second position different than the first position. The first plurality of 3D coordinates and the second plurality of 3D coordinates are registered together to obtain a common plurality of 3D coordinates, the common plurality of 3D coordinates being in a common frame of reference. In other words, the 3D coordinates are changed for at least one of the first or second plurality of 3D coordinates so that both sets of 3D coordinates are properly placed within a common frame of reference.

Figure 6:
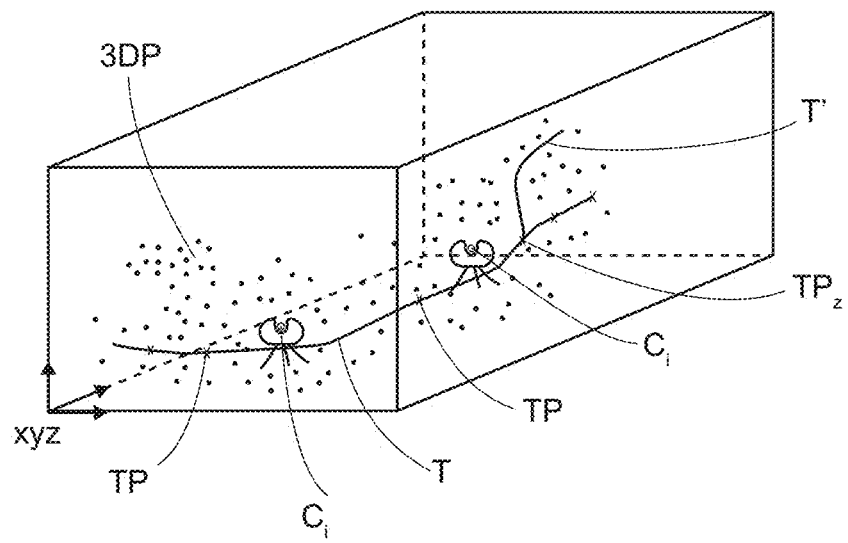
FIG. 6 is a schematic illustration of the scene measured with a laser scanner to produce a three-dimensional point cloud and a trajectory.
Figure 7:
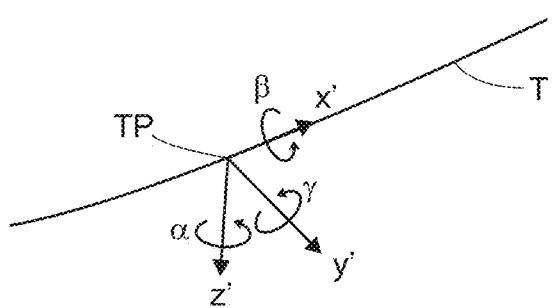
FIG. 7 shows a schematic illustration of the three angles of rotation at a trajectory point.
Figure 8:
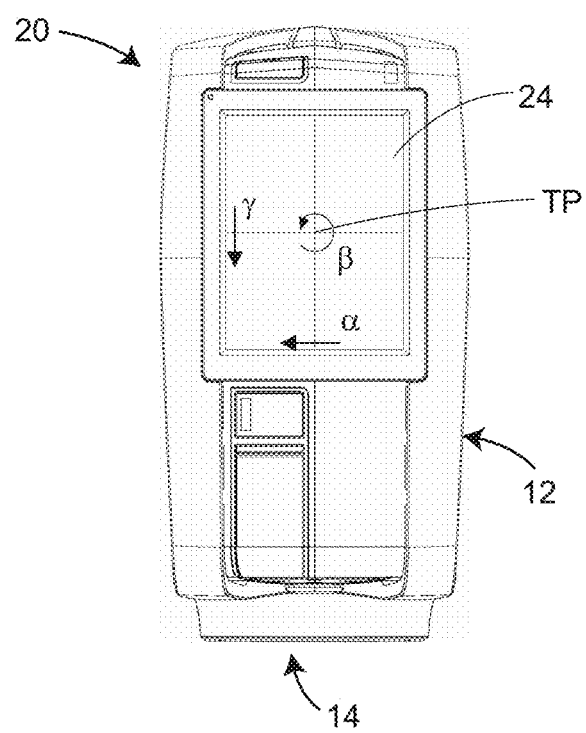
FIG. 8 is a side view of a laser scanner having a display unit on which is shown a panoramic view that may be rotated along three axes.

According to embodiments of the present invention, a trajectory T in the FIG. 6 is laid through the scene in the coordinate system xyz to visualize the three-dimensional point cloud 3DP. More specifically, the 3D point cloud is projected onto a 2D representation as might be seen by a camera or human eye, as illustrated previously in FIG. 5. It should be pointed out that the trajectory shown in FIG. 6 may pass through the centers Ci of the scanners (the scanning centers) or pass alongside or significantly apart from the scanning centers Ci. From the theoretically infinitely dense points of the trajectory T, several trajectory points TP are selected, which are (slightly) spaced apart from one another. For each of the trajectory points TP, a local coordinate system of the observer is associated with possible angles of rotation $\alpha\beta\gamma$ as shown in FIG. 7. In an embodiment, the panoramic image is obtained by projecting 3D point clouds onto a 2D surface according to a direction determined by selected angles $\alpha\beta\gamma$. The selected angles of rotation $\alpha\beta\gamma$ that provide the basis for the panoramic image on display unit 24 of FIG. 8. In the ideal case, the gaps between the closest measuring points X from the three-dimensional point cloud 3DP are filled, i.e. surface areas are defined, as described, for example, in U.S. Published Patent Application No. 2014/0022555, the contents of which are incorporated herein by reference.

A further explanation of panoramic and 3D displays is now given. The term panoramic as used herein refers to a display in which angular movement is generally possible about a point in space, but translational movement is not possible (for a single panoramic image). A 3D display on the other hand as used herein generally refers to a display in which provision is made (through user controls) to enable not only rotation about a fixed point but also translational movement from point to point in space.

An impression of producing a 3D display or a panoramic display is usually the result of presenting images from different views, the combination of which produces a 3D effect. In normal 2D vision, there are many cues that indicate the presence of depth. For example, distant objects appear smaller than nearby objects of the same size. The brain ordinarily compensates for the apparent distance so that objects may appear to be the same size even though one makes a much smaller image on the retina. In the same way, a collection of 2D images presented sequentially along a path may produce a 3D effect. A collection of 2D images presented through a rotation may produce a panoramic effect.

As used herein, the term 2D image is understood to have several possible (but related) meanings. In its simplest form, a 2D image is an image as seen by a camera or an eye. It may be modified by mathematical processing, for example, through meshing to form small triangles to smoothly represent object surfaces. Collected point cloud data may be mathematically modified to obtain desired smoothness, edge contrast, and so forth. Whether point cloud data is directly projected as through a lens to obtain a flat 2D image or whether point cloud data is mathematically processed to obtain a 2D image, as the terminology is used herein, a 2D image is obtained in both cases.

Embodiments of the present invention as discussed herein involve a collection of 2D images which, when viewed from a single trajectory point yield a panoramic display. Such a viewpoint is from a point fixed in space but with a viewpoint that may be rotated to any desired angle. However, because there are multiple trajectory points on a panoramic display, provision is also made for traveling along the trajectory and then stopping as desired to view selected regions from a variety of angles.

As explained hereinabove, the respective coordinate system for the angles of rotation $\alpha\beta\gamma$ of each trajectory point TP may be defined with three angles of rotation about three axes. In an embodiment, a local coordinate system x'y'z' provides for a roll angle (roll) $\beta$, which is a rotation about x', which initially is oriented tangent to the trajectory T, the pitch angle (pitch) $\gamma$, which is a rotation about the transverse axis y', and the yaw angle (yaw) about the axis z'. In a simple case, the angles $\alpha$, $\beta$, and $\gamma$ are all equal to zero. In an embodiment, an operator may change the angles α, β, and γ to provide a view in any desired direction around a point lying on the trajectory T.

For the visualization of the three-dimensional point cloud 3DP, the trajectory points TP are approached one after another, and the display unit 24 displays, for each of the current trajectory points TP (i.e. the viewpoint), a 2D image corresponding to the view of an observer looking in the direction αβγ. The display unit 24, however, may include 2D views corresponding approximately to the human field of vision, or other fields of view may be selected. In an embodiment, a wide angle or fish-eye view may be selected. In another embodiment, a narrow field of view shows close-up details of a scanned image.

It is known in the art to provide videos that provide a 3D experience. Such videos may give an observer the impression of flying through a scene—for example, flying through rooms in a castle or flying through rooms in a factory to obtain a virtual factory tour. Such restrictions in the defined path (trajectory) have the advantage of showing the observer those things considered to be of interest or importance to the observer. For example, on a real estate tour, a seller may wish to highlight certain desired aspects of the real estate being sold. In some cases, such defined paths are also meant to limit the amount of data to which the observer has access—for example, to prevent the observer from viewing items that are considered confidential or to require a clearance (for example, a security clearance) beyond that available to the observer.

Despite the advantages of providing a defined path or trajectory for a 3D video experience (though the sequential presentation of 2D images), embodiments of the present invention have the ability to provide the observer with greater flexibility to control to a greater degree the way in which 3D data is provided. These degrees of control include (1) the ability to speed, slow, or stop the path along a trajectory; (2) to select a trajectory path from among a (finite) plurality of trajectory paths; (3) to permit the user to look in any direction, for example, by controlling pitch, yaw, and roll angles, as discussed previously; and (4) to change the field of view of the scene, from normal human vision to fish-eye view or narrow view, in effect providing a zoom functionality in the displayed images. Control by the observer of the degrees of control may be obtained by an input unit such as a joystick, trackball, mouse, keyboard, scroll wheel, touch screen built into a display unit, voice interpreter mechanism, or gestures mechanism. For example, such control mechanisms may be used to control the field of vision, the zoom and processing speed, the angular view (for example, yaw, pitch, and roll angles).

Display of the video image (produced by sequentially displayed 2D images) may be provided in a display unit built into the scanner, on a display monitor of a computer, on a display in a smart device such as a smart phone or smart pad, or on an image projected by a projector. The display may be a heads up display built into eyeglasses or into an immersive virtual reality headset. In general any kind of display device may be used.

The user interface may be used to provide the degrees of control described above. Such a user interface may be provided on the display that shows the video image, on a separate display, or without a display at all. In the latter case, the user interface may be a simple intuitive interface, for example, an interface provided by a stand-alone joystick. The user interface may be provided through software built into an element of the scanner or display device, or it might be provided through application software used in conjunction with the scanner or display device. The default settings for direction of view and field of view may correspond to the default setting of a camera, and the user interface configured to permit camera settings to be changed interactively during visualization in a manner analogue to a camera control. It is conceivable, for example, that pressing of a mouse button activates navigation elements for the direction of view and rotating a scroll wheel activates slides for the field of view (or any of the control possibilities within the degrees of control).

Through the interactive elements, additional information on the scanned objects O—if available—can be queried. The scanned objects O can, for example, be provided with marks, which show the additional information when selected, for example, when a mouse pointer is moved over them. Alternatively, controls may be provided that always provide certain types of object information when pressed. As an example, such additional information might include object dimensions or technical specifications. It might include a display of tolerance information—for example, a color coded image in which color corresponds to degree of deviation from a nominal value, for example, in a computer aided design (CAD) file. Such additional information might include access to operation information as might be presented in an operation manual or in a video course. Such additional information might include the latest production figures associated with the number of units produced by a machine per day or the profitability of a business operation viewed in the display. It might include the degree of contamination by radiation (alpha, beta, or gamma radiation) of certain regions. Such additional information might include possible changes or additions to objects, for example, additions through augmented reality. Additional information may take the form of links that provide additional information on the objects being viewed—for example, hyperlinks to the Internet or to a company's network or cloud data storage. By way of interactive elements, the observer may also be enabled to see inner views of an object—for example, section views or views of objects behind walls. It is possible to charge an observer to obtain certain selected views of an object, behind an object, within an object (which might be a large object such as a room), or to access a link attached to the object.

In an embodiment, tags attached to scanned objects—for example, RFID tags, NFC tags, or barcode tags—are collected by suitable tag electronics attached to the scanner as the scanner is moved from one location to another or as the scan is being taken. Such tags may provide data or links to data that enable the additional information described in the previous paragraph above.

It is possible for software to enable an observer to exit (abort or interrupt) visualization along the trajectory T and to change to another representation of the three-dimensional point cloud 3DP, for example, to a three-dimensional representation in which the observer is permitted to move off the trajectory T. For example, visualization may be exited at any of the trajectory points TP. For the case in which scan centers Ci lie on the trajectory T, exiting the trajectory may be particularly thought of at these centers Ci.

One or multiple trajectory points TP may be defined as branch points $TP_Z$, for example, resulting in a trajectory branch T' shown in FIG. 6 that branches from the former trajectory T. At the point $TP_Z$, it is possible to continue the former trajectory T or alternatively to leave it, in order to change to the trajectory branch T'. Instead of approaching the trajectory points TP in continuation of the former trajectory T, trajectory points TP on the trajectory branch T' may be approached. In an embodiment, further interactive elements provide the user the ability to branch off at the branch points $TP_Z$. In the case which requires most computing capacity, each trajectory point TP is a branch point $TP_Z$.

There are many possibilities to provide an observer a way of moving along the trajectory T or branches T'. In an embodiment, an observer is provided a user interface that includes elements found in a typical video control, for example, controls typically found on camera video playback or Internet video. Such controls include a provision for showing a video at a normal speed, with options to stop the forward motion at any time by pressing a Pause button, usually represented by a symbol having two parallel vertical lines. Normal speed video may be resumed by pressing the Pause button a second time or by pressing a Play button, which is usually represented by a right pointing arrowhead. Additional buttons are usually provided for fast forward and reverse play. A horizontal scroll bar is usually provided that shows progression of the video play, with a marker moving left to right as the video progresses. Usually a time shown on the display indicates the time over which the video has been playing. In the case of the present invention, the time may be replaced by the distance traveled along the trajectory T (or collection of trajectories, including T'). Such distance traveled may be obtained from the 3D scan data.

A simple user interface is one that provides two display modes in a user interface: a trajectory display mode and a rotational display mode. In the trajectory display mode, the mode is configured to display a collection of 2D images sequentially along a collection of trajectory points. Such points may be automatically displayed sequentially to produce a self-running video, or they may be selected manually, for example, with a finger on a touch screen. In the rotational display mode, the mode is configured to 2D images at a single trajectory point and from a view direction selected by the user from about a plurality of observer view directions.

Ordinarily, video controls such as those described above provide a means to move to a new position in the video. For example, a user may start a video running from a time about halfway through by pressing the scroll bar at a position about halfway to the end. In most cases, however, video controls today do not provide the user the ability to view a continual progression of video footage by manual means. In an embodiment of the present invention, it is useful to provide the ability to move smoothly along the video footage by moving a mouse over a scroll bar. Alternatively, smooth movement may be obtained by moving a finger over the desired trajectory (for example, T, T') on a touchscreen. In other words, the user may be provided with the ability to view progression of images along the path in an automatic video mode or in a manually controlled mode.

Additional video controls may include rotation controls and zoom (also known as field of view or field of vision) controls. Rotation controls are usually used when stopped at a desired position along the trajectory. At such a position, the user may elect to rotate the view to allow the observer to see in any direction, but from the same fixed point (a panoramic view). Controls could be individual angular controls (that may include pitch, roll, and yaw controls), for example, or they may conveniently be attached to a trackball using other rotational user interfaces such as are used in products today. Zoom controls may include a zoom bar allowing the user to select any desired field of view from the minimum to maximum possible. Alternatively, the user may be allowed to select from among a fixed number of possible zoom values.

Additional controls may allow a user to view additional information about objects along the trajectory, if such information is available. For example, buttons may be provided to allow the user to observe aspects associated with the objects such as nominal dimensions, actual dimensions, tolerances, color deviation maps (or whisker maps, etc.), and production history. In an embodiment, markers appearing directly on a display may be clicked to obtain supplementary information or to access a hyperlink to training videos or other product information. In some cases, a control may permit the user to select a choice of views—for example, a first view of an object, and a second view of a characteristic of the object—for example, radiation exposure over different parts of the object or temperature values over different parts of the object, the temperature being obtained through the use of infrared imaging for example.

Additional controls may permit the user to see a cross sectional view or interior view of an object, for example by selecting a button labeled "cross sectional view" or another button labeled "remove top layer" or "show internal elements." In some cases, a user may be asked to provide a numerical value, possibly in response to a query such as "at what depth should the cross section be taken?"

As explained hereinabove, a trajectory may be provided in advance or determined in response to a user action. An advantage of providing a trajectory in advance, besides those advantages given hereinabove, is that less computing time and computing capacity may be required than for the case in which a trajectory is not defined in advance. In some cases, however, branched trajectories and freely selectable trajectories may provide a more interesting or useful observer experience.

With an increasing number of branch points $TP_Z$, it becomes more appropriate to perform the only those panoramic display computations needed as the next trajectory point TP is approached instead of pre-processing data for the entire path T. In this case, the trajectory T is definable during visualization, which is to say that it can be changed (almost) freely.

When scans are collected with the scanner placed at a plurality of locations, the scan data must be registered together to place the collected point cloud data into a common frame of reference. Such registration may use intentionally placed targets such as spheres or checkerboards placed in the scene or natural targets such as intersection lines or other natural features in the scene. Registering of the plurality of scans may take place immediately following capture of the scans (or some of the scans), more or less in real time. Likewise, if the preferred trajectory is provided ahead of time or selected by an operator during data collection, processing may take place immediately following or during scan data capture so that visualization calculations along the trajectory are provided to the operator more or less in real time. It is thus possible to follow preliminary analysis of the scene by capturing further scans when the preliminary analysis indicates the need. Alternatively, registration and particularly visualization may take place later.

As stated hereinabove, pre-processing of the data of the three-dimensional point cloud 3DP is performed in advance of the visualization. This pre-processing comprises a first step of defining at least one trajectory T with several trajectory points TP and a second step of performing computations to enable viewing of along the trajectory points TP with a range of control options selectable by the observer. Within the first step, either the trajectory T is defined first and the trajectory points TP are selected along the trajectory T or the trajectory points TP are defined first and the trajectory T is the connection of the trajectory points TP. In the same manner, if applicable, any trajectory branches T' are defined and the control options (available to the observer) are defined.

For the sake of clarity, embodiments of the present invention have been described above for the case of 3D data collected by a TOF scanner. It should be appreciated, however, that embodiments of the present invention may include any type of 3D measuring instrument that collects groups of data points from a plurality of locations. Such 3D measuring instruments include laser trackers, articulated arm coordinate measurement machines (CMMs), Cartesian CMMs, triangulation scanners, TOF cameras, and computed tomography (CT) machines. Also include are 3D measuring instruments that combine multiple types of 3D measuring devices together in a single device—for example, a triangulation scanner attached to an articulated arm CMM.

A laser tracker is a device that steers a beam of light to a cooperative retroreflector that returns the light to the tracker. In most cases, the tracker follows (tracks) the retroreflector as it is moved. The tracker measures a distance and two angles to the retroreflector, thereby providing the basis for three-dimensional measurements of the retroreflector center. The retroreflector may be placed inside a sphere to produce a spherically mounted retroreflector (SMR). By moving the SMR in contact with an object, a collection of retroreflector points may be obtained at rates up to a few thousand points per second and from these points the 3D coordinates of the contact surface extracted. The points collected in this manner constitute a point cloud and may be treated in the manner described hereinabove.

An articulated arm CMM is a device that includes a base, a collection of arm segments connected together by joints, and having a 3D measuring probe on the end. The joints, which are usually swivel joints or hinge joints, each include at least one angular encoder that measures angles of rotation of the arm segments. By knowing the lengths of the arm segments and the angles provided by the angular encoders, the position and orientation of the 3D measuring probe may be determined. The 3D measuring probe may be a tactile probe that determines 3D coordinates of surface points to which it is brought into contact. Alternatively, the 3D measuring probe may be a triangulation scanner or other measuring element.

A triangulation scanner is a device that, in most cases, combines a projector and a camera having a known baseline distance between the projector and camera. By knowing the pattern that is projected onto a surface, the pattern of light received by the camera may be evaluated mathematically to determine 3D coordinates of the surface may be determined by methods well known to those of ordinary skill in the art.

A TOF camera is a camera that, in addition to determining angles to an object angle in correspondence to camera pixels also determines distance in correspondence to camera pixels. In this sense, a TOF camera provides the same information as a triangulation scanner but without a separate projector spaced apart from the camera.

A CT machine is a device that measures an object from a variety of perspectives and from the data determines the 3D dimensional characteristics. In most cases, the term CT is reserved for machines having the ability to determine 3D coordinates of internal as well as external features of an object. A common type of CT machine used both in industrial applications and medical applications is the X-ray CT machine. Such a device sends X-rays through an object as the object is turned, for example, on a turntable. An X-ray detector records (indirectly) the amount of X-ray energy reaching it at each of a number of pixels on the X-ray detector. By noting the change in X-ray intensity reaching it from each of the collection of angles, the 3D coordinates of the object may be determined. For the case of medical CT applications, a trajectory may be constructed along a series of arteries or veins or a portion of the digestive tract, for example.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," "unit," or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that may contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the laser scanner, partly on the laser scanner, as a stand-alone software package, partly on the laser scanner and partly a connected computer, partly on the laser scanner and partly on a remote computer or entirely on the remote computer or server. In the latter scenario, the remote computer may be connected to the laser scanner through any type of network, including a local area network (LAN) or a wide area network (WAN), or the connection may be made to an external laser scanner (for example, through the Internet using an Internet Service Provider).

Aspects of the present invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, may be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer readable medium that may direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The term processor as used herein encompasses all types of processing devices including, but not limited to, microprocessors, microcontrollers, digital signal processor (DSP) devices, and field-programmable gate array (FPGA) devices. These devices may be included in the measuring instrument (e.g., the scanner) or in an external computer.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, may be implemented by special purpose hardware-based systems that perform the specified functions or acts, or combinations of special purpose hardware and computer instructions.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A method of interactively displaying panoramic images of a scene, the method comprising:
   measuring a first plurality of 3D coordinates of the scene with a 3D measuring instrument placed in a first frame of reference at a first position;
   measuring a second plurality of 3D coordinates of the scene with the 3D measuring instrument placed in a second frame of reference at a second position different than the first position;
   registering the first plurality of 3D coordinates and the second plurality of 3D coordinates together in a common frame of reference;
   providing a trajectory within the scene, the trajectory including a collection of trajectory points;
   generating along the trajectory a plurality of two-dimensional (2D) images at each trajectory point wherein the 2D images define panoramic views at each of the trajectory points;
   providing a rotational display mode, the rotational display mode configured to display the 2D images on a display device at a single trajectory point from a selected view direction; and
   displaying the rotational display mode on the display device in response to an input from a user.

2. The method of claim 1, wherein:
   the first plurality of 3D coordinates and the second plurality of 3D coordinates define a 3D point cloud; and
   each panoramic view is obtained by projecting 3D point clouds onto a 2D surface.

3. The method of claim 2, further comprising 2D images are displayed in manner selected from a group comprising: a field of view of the scene, a normal human vision view, a fish-eye view, and a narrow view.

4. The method of claim 1, wherein the display device is coupled to a coordinate measurement device, the coordinate measurement device measuring the first plurality of 3D coordinates and the second plurality of 3D coordinates.

5. The method of claim 1, further comprising displaying information about an object in response to the user selecting the object in a 2D image.

6. The method of claim 5, wherein the information includes at least one of a nominal dimensions, an actual dimensions, a tolerances, a color deviation maps (or whisker maps, etc.), or a production history.

7. The method of claim 5, wherein the displaying information about the object includes changing a color of the object based at least in part on a deviation of the object from a nominal value.

8. The method of claim 6, further comprising:
   acquiring a first data from each of a first plurality of scanned objects when the first plurality of 3D coordinates are measured;
   wherein each of the first plurality of scanned objects includes at least one of an RFID tag, an NFC tag or a barcode; and wherein the first data is the displayed information.

9. The method of claim 1, further comprising providing a trajectory display mode, the trajectory display mode configured to display a collection of the 2D images sequentially along the collection of trajectory points.

10. The method of claim 9, further comprising generating a video image by automatically sequentially displaying the collection of 2D images.

11. The method of claim 1, wherein each of the panoramic views includes an observer field of view (FOV), each of the panoramic views being viewable from any of a plurality of observer FOV directions.

12. A method of interactively displaying panoramic images of a scene, the method comprising:
    measuring a first plurality of 3D coordinates of the scene with a 3D measuring instrument placed in a first frame of reference at a first position;
    measuring a second plurality of 3D coordinates of the scene with the 3D measuring instrument placed in a second frame of reference at a second position different than the first position;
    registering the first plurality of 3D coordinates and the second plurality of 3D coordinates in a common frame of reference;
    providing a trajectory within the scene, the trajectory including a collection of trajectory points;
    generating along the trajectory a plurality of two-dimensional (2D) images at each trajectory point, the 2D images defining panoramic views at the trajectory points; and
    providing a trajectory display mode, the trajectory display mode configured to display on a display device a collection of the 2D images sequentially along the collection of trajectory points.

13. The method of claim 12, wherein the 2D images based at least in part on the first plurality of 3D coordinates and the second plurality of 3D coordinates in a common frame of reference.

14. The method of claim 13, wherein each of the panoramic views includes an observer field of view (FOV), each of the panoramic views being viewable from any of a plurality of observer FOV directions.

15. The method of claim 12, wherein the first plurality of 3D coordinates and the second plurality of 3D coordinates are registered together in a common plurality of 3D coordinates, the common plurality of 3D coordinates being in the common frame of reference.

16. The method of claim 12, further comprising generating a video image by automatically sequentially displaying the collection 2D images.

17. The method of claim 12, further comprising defining the trajectory prior to measuring the first plurality of 3D coordinates.

18. The method of claim 12, further comprising providing at least one branched trajectory.

19. The method of claim 12, wherein the collection of trajectory points includes a first trajectory point and a second trajectory point.

20. The method of claim 19, further comprising:
    generating in a first instance a first plurality of 2D images of the plurality of 2D images for the first trajectory point, the first plurality of 2D images defining panoramic views at the first trajectory point;
    displaying on the display device the first plurality of 2D images
    receiving an input from the user to display the second trajectory point;
    generating in a second instance a second plurality of 2D images of the plurality of 2D images for the second trajectory point, the first plurality of 2D images defining panoramic views at the first trajectory point, the second instance occurring after the input from the user; and
    displaying on the display device the second plurality of 2D images.

* * * * *